Nov. 22, 1949  M. S. BAKER  2,488,756
TRANSMISSION
Filed Jan. 9, 1947  4 Sheets-Sheet 1

INVENTOR.
Malvern S. Baker
BY Hauke & Hardesty
ATTORNEYS

Nov. 22, 1949     M. S. BAKER     2,488,756
TRANSMISSION
Filed Jan. 9, 1947     4 Sheets-Sheet 2

INVENTOR.
Malvern S. Baker
BY Hauke & Hardesty
ATTORNEYS

Nov. 22, 1949 M. S. BAKER 2,488,756
TRANSMISSION
Filed Jan. 9, 1947 4 Sheets-Sheet 3

INVENTOR.
Malvern S. Baker
BY Hauke & Hardesty
ATTORNEYS

Nov. 22, 1949 M. S. BAKER 2,488,756
TRANSMISSION
Filed Jan. 9, 1947 4 Sheets-Sheet 4

INVENTOR.
Malvern S. Baker
BY Hauke & Hardesty
ATTORNEYS

Patented Nov. 22, 1949

2,488,756

UNITED STATES PATENT OFFICE 2,488,756

TRANSMISSION

Malvern S. Baker, Muskegon, Mich., assignor to Continental Motors Corporation, Muskegon, Mich., a corporation of Virginia Application January 9, 1947, Serial No. 720,945

3 Claims. (Cl. 74—792)

This invention relates to transmissions, especially to marine applications of transmissions.

In marine power applications, it is necessary that the direction of propeller rotation be reversible in a minimum of time. This is essential for close control of the craft.

It is an object of this invention to provide a marine transmission which is quickly and easily shifted from forward to reverse and back again. This object is accomplished in a planetary reversing gear in which means are provided to hold the planet carrier stationary for reverse gear drive, and other means are provided to lock the planet gears against rotation about their own axes so that the entire gear train rotates as a unit for forward speed. The means for locking the planet carrier against rotation comprises a hydraulically actuated brake, and the means for locking the gear train to rotate as a unit comprises a clutch at each end of the transmission, the two clutches being actuated simultaneously by a linkage extending between the two clutches.

Figure 1:
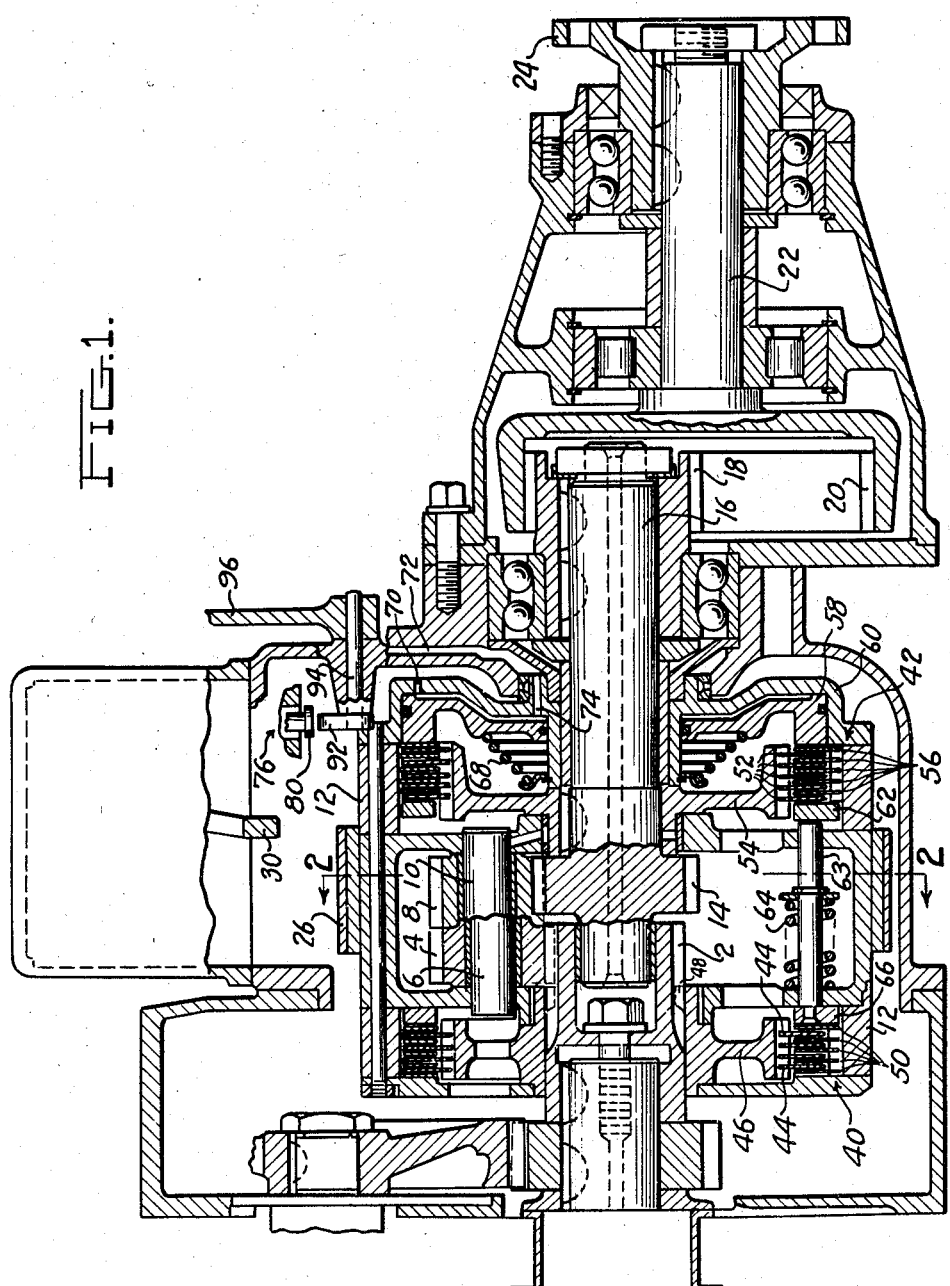
Fig. 1 is a view in section substantially on line 1—1 of Fig. 2.
Figure 2:
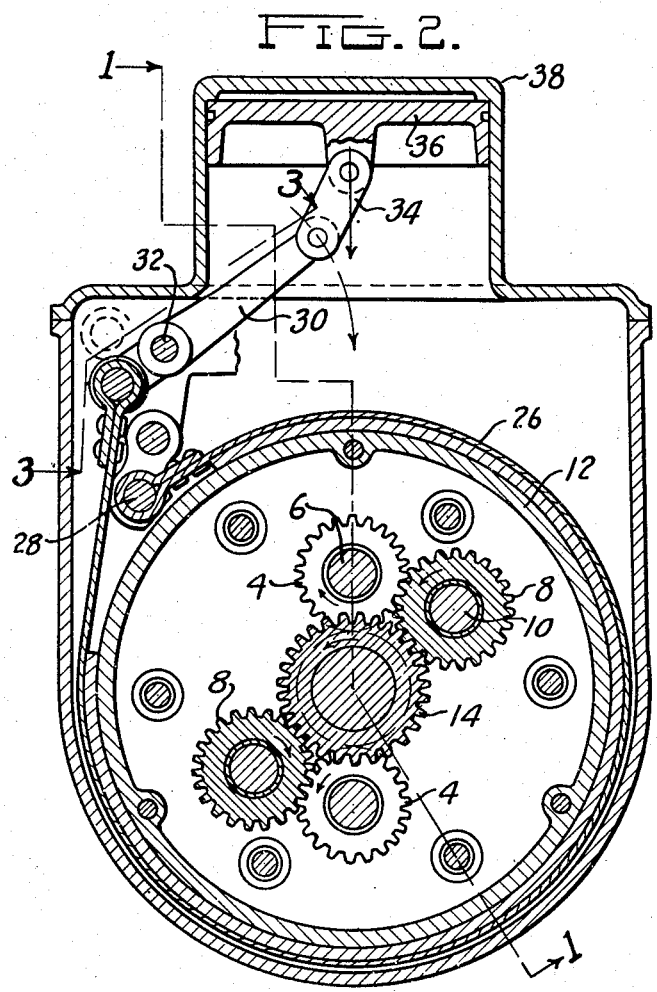
Fig. 2 is a view in section substantially on line 2—2 of Fig. 1.
Figure 3:
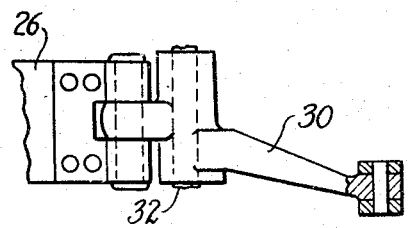
Fig. 3 is a detail view in section substantially on line 3—3 of Fig. 2.

Power is supplied to an input power gear or sun gear 2. Gear 2 meshes with and drives a second gear 4 which is mounted for rotation about its own axis on pin 6. Gear 4 meshes with and drives a third gear 8 which is mounted for rotation about its own axis on a pin 10. Pins 6 and 10 are mounted in a rotatable planet carrier 12.

Gear 8 meshes with and drives the output power gear or sun gear 14. Gear 14 is keyed to and drives intermediate shaft 16, to which is keyed a pinion 18 which drives reduction ring gear 20. Output shaft 22 is driven by gear 20, and has mounted thereon a coupling flange 24. In the event that it is desired to drive the propeller at engine speed, rather than through a gear reduction, flange 24 may be secured directly to intermediate shaft 16. In that event, shaft 16 becomes the output shaft.

A brake band 26 is mounted in position to grip the planet carrier 12 in order to hold carrier 12 against rotation, and thereby hold the axes of gears 4 and 8 against rotation about the axis of gears 2 and 14. Brake band 26 is connected at one end to an anchor pin 28 and is wound around planet carrier 12 in such a way as to be self wrapping. The free end is connected to one end of a lever arm 30 which has its fulcrum at pin 32. The other end of lever 30 is connected by a link 34 to be moved by a piston 36 which is reciprocable in cylinder 38.

A multiple disc clutch indicated generally at 40 is provided at the forward end of the transmission and a second similar clutch indicated generally at 42 is provided at the rear end of the transmission. Clutch 40 comprises one set of discs 44 which is non-rotatable with respect to power gear 2 through a central member 46. Member 46 has teeth 48 which engage the teeth of gear 2. Clutch 40 has another set of discs 50 which is nonrotatable with respect to the planet carrier 12. Clutch 42 has a set of discs 52 which is nonrotatable with respect to output gear 14 through a central member 54. Member 54 is shown as being keyed to intermediate shaft 16. Clutch 42 has another set of discs 56 which is nonrotatably associated with planet carrier 12.

A piston 58, reciprocable in cylinder 60, is positioned to bear against the rearmost plate of clutch 42 to actuate or engage that clutch. In order for clutch 42 to be engaged, the discs of that clutch must be compressed between the face of pistons 58 and a pressure plate 62. However, pressure plate 62 is not fixed against axial displacement except to the extent that such displacement is resisted, through compression link 63, by a spring 64 and by a second pressure plate 66 which tends to compress the discs of clutch 40 and thus engage that clutch. Thus the two clutches 40 and 42 must be engaged simultaneously.

A spirally coiled spring 68 is provided to return piston 58 to the position in which the two clutches are disengaged. In order to guard against the engagement of the two clutches by a pumping action of residual fluid in cylinder 60 operating against piston 58, a small bleed port 70 is preferably provided in cylinder 60.

Hydraulic fluid to actuate cylinder 58 is provided through passages 72 and 74 through the transmission housing and hydraulic cylinder respectively (see Fig. 1.)

Figure 4:
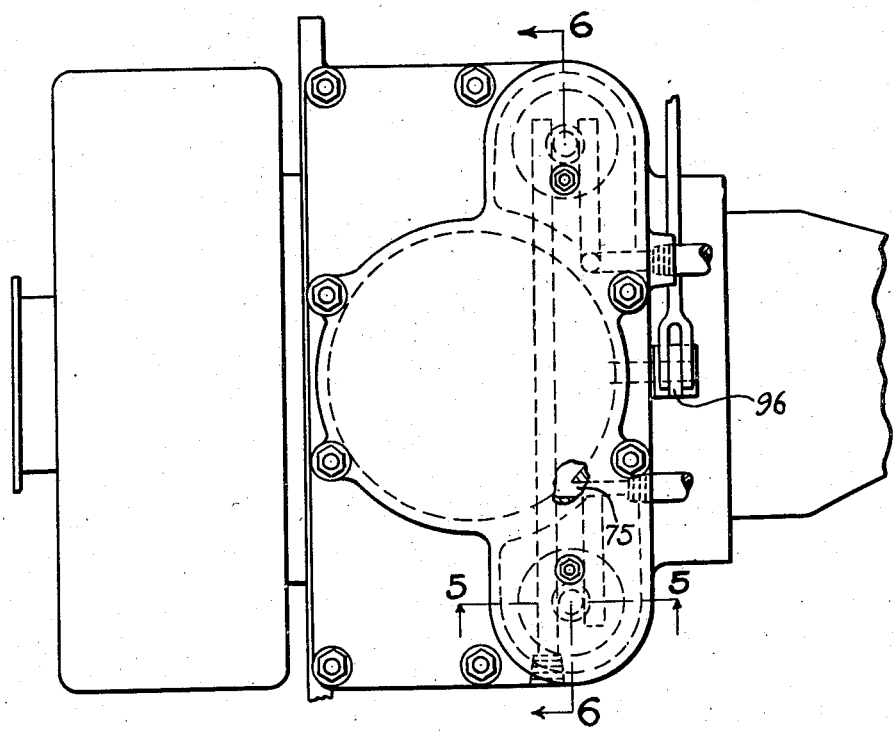
Fig. 4 is a top plan view.

Piston 36 is hydraulically actuated by fluid admitted to cylinder 38 through suitable passages, such as passage 75 shown in Fig. 4.

Figure 5:
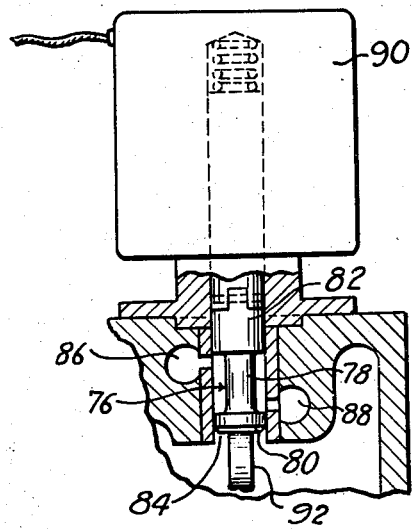
Fig. 5 is a view in section substantially on line 5—5 of Fig. 4.
Figure 6:
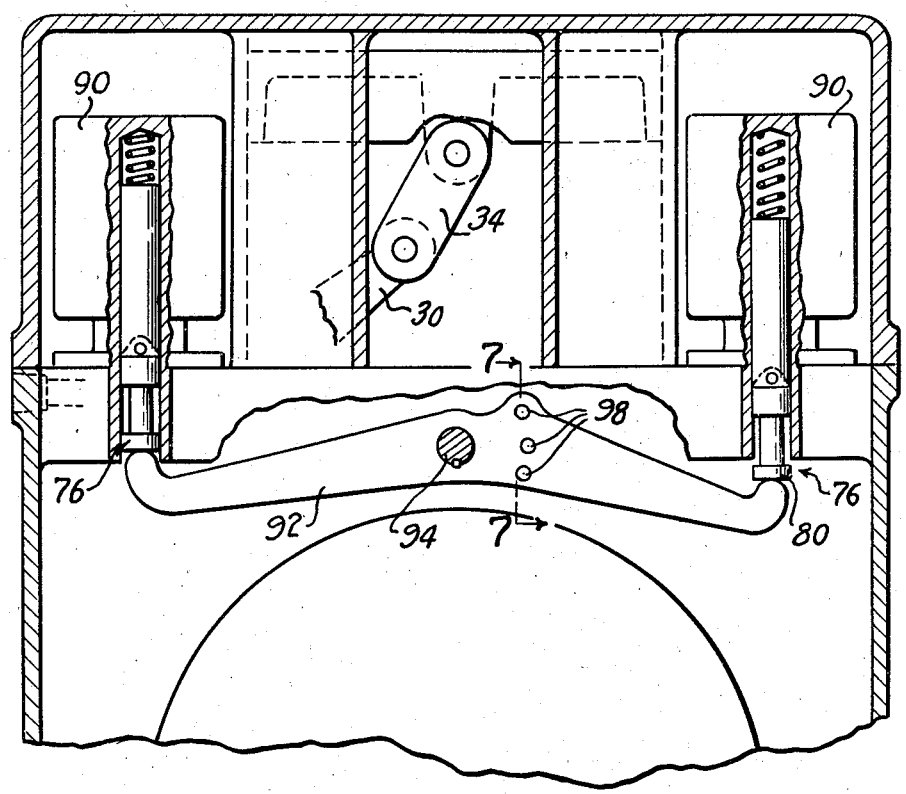
Fig. 6 is a view in section substantially on line 6—6 of Fig. 4.
Figure 7:
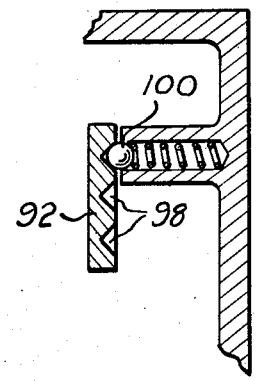
Fig. 7 is a view in section substantially on line 7—7 of Fig. 6.

The flow of hydraulic fluid to cylinders 38 and 60 is controlled by means of piston type valves 76 (see Figures 5 and 6). As seen in Fig. 5, piston valve 76 comprises a small diameter stem 78 having a large diameter piston 80 at one end and a similar large diameter piston 82 at its other end. The pistons 80 and 82 have a sliding fit in cylinder 84, and are so spaced as to permit the passage of fluid from the pressure port 86 to cylinder port 88 when occupying the position shown in Fig. 5. If valve 76 is moved down so that piston 80 drops below the lower end of cylinder 84, then piston 82 covers up the outlet of port 86, and passage 88 is ported to the casing interior, permitting fluid to drain out of the actuating cylinder. This latter position of valve 76 is shown in Fig. 1 and on the right side of Fig. 6.

Valves 76 are connected to be actuated by solenoids 90 in a manner well known to those skilled in the art. With the solenoids 90 connected to operate the valves 76, the transmission may be remotely controlled merely by the manipulation of switches connected to energize and de-energize the solenoids 90. In order to interlock the two solenoids to prevent engaging the two clutches and setting the brake simultaneously, the switches for the control of solenoids 90 may be so arranged that, when one solenoid is energized, the other is de-energized.

In the event of failure of the electrical system, valves 76 may be operated mechanically by a rocker arm 92 mounted to pivot about a pin 94, and connected to be actuated by lever 96. Lever 92 is preferably provided with recesses 98 which cooperate with a spring-biased ball detent 100 to hold the rocker arm 92 in any of three positions: neutral, forward, or reverse.

For simplicity of operation, engine lubricating oil is preferably used for control and lubrication of the transmission.

Operation

With brake band 26 loose on planet carrier 12, and with clutches 40 and 42 disengaged, the transmission is in neutral.

To set the transmission for forward speed, hydraulic fluid is admitted to cylinder 60, moving piston 58 to the left as seen in Fig. 1, and engaging the two clutches 40 and 42 simultaneously through the compression link 63. With clutches 40 and 42 engaged, power gear 2 drives output gear 14 through the central member 46, clutch plates 44 and 50, planet carrier 12, clutch plates 56 and 52, and central member 54. Thus the planetary gear train rotates as a unit and intermediate shaft 16 rotates in the same direction and at the same speed as power gear 2.

In order to shift the transmission from forward to reverse, the appropriate valve 76 is permitted to drop down so that fluid may drain out of cylinder 60 into the casing, permitting spring 68 to move cylinder 58 to the right as seen in Fig. 1, and permitting spring 54 to move compression link 63 to the right, thus disengaging the two clutches 40 and 42. Brake 26 is thereupon set to stop rotation of planet carrier 12, whereupon power gear 2 drives output gear 14 in reverse through the two planet gears 4 and 8.

I claim:

1. In a reversing transmission, a planetary gear mechanism comprising driving and driven sun gears, planet gears, and a planet gear carrier having means rotatably supporting said planet gears, clutch means at each end of said planetary gear mechanism and respectively connected to the driving and driven sun gears and the planet carrier, and means operable to engage both said clutch means comprising floating pressure rings separate from the clutch means and axially movable relative to said planet carrier, and means supported by said planet carrier to transmit forces to said pressure rings and to simultaneously engage both said clutch means.

2. In a reversing transmission, a planetary gear mechanism comprising driving and driven sun gears, planet gears, and a planet gear carrier having means rotatably supporting said planet gears, clutch means at each end of said planetary gear mechanism and respectively connected to the driving and driven sun gears and the planet carrier, and means operable to simultaneously engage both said clutch means and comprising axially movable pressure rings for each clutch means and separate from said clutch means, and spring biased means interconnecting said pressure rings and supported by said planet carrier.

3. In a reversing transmission, a planetary gear mechanism comprising driving and driven sun gears, planet gears, and a planet gear carrier having means rotatably supporting said planet gears, clutch means at each end of said planetary gear mechanism and respectively connected to the driving and driven sun gears and the planet carrier, and means operable to simultaneously engage both said clutch means comprising axially movable pressure rings separate from said clutch means, one for each clutch means, means clutching one of said clutch means, pins supported for axial movement by said planet carrier and nested symmetrically around said planet carrier axis, and compression springs acting directly on said pins to declutch said clutch means.

MALVERN S. BAKER.

REFERENCES CITED

The following references are of record in the file of this patent:

UNITED STATES PATENTS

| Number | Name | Date |
|---|---|---|
| 1,131,861 | Perkins | Mar. 16, 1915 |
| 1,694,294 | Tuttle | Dec. 4, 1928 |
| 2,018,014 | Fahrney | Oct. 22, 1935 |
| 2,080,067 | Stucatur | May 11, 1937 |
| 2,230,604 | Ware | Feb. 4, 1941 |
| 2,251,625 | Hale | Aug. 5, 1941 |